(12) United States Patent
Allen

(10) Patent No.: US 10,531,710 B2
(45) Date of Patent: Jan. 14, 2020

(54) BUCKLE ASSEMBLY

(71) Applicant: Ron Allen, Lakewood, CA (US)

(72) Inventor: Ron Allen, Lakewood, CA (US)

( * ) Notice: Subject to any disclaimer, the term of this patent is extended or adjusted under 35 U.S.C. 154(b) by 118 days.

(21) Appl. No.: 15/808,165

(22) Filed: Nov. 9, 2017

(65) Prior Publication Data

US 2019/0133261 A1 May 9, 2019

(51) Int. Cl.
*B60R 22/34* (2006.01)
*A44B 11/25* (2006.01)

(52) U.S. Cl.
CPC .......... *A44B 11/2557* (2013.01); *B60R 22/34* (2013.01)

(58) Field of Classification Search
CPC .............................. A44B 11/2557; B60R 22/34
See application file for complete search history.

(56) References Cited

U.S. PATENT DOCUMENTS 5,979,026 A * 11/1999 Anthony ............. A44B 11/2511
24/633
7,904,997 B2 * 3/2011 Foubert .............. A44B 11/2526
24/631
8,632,131 B2 * 1/2014 Humbert ................. B60R 22/40
297/477
2012/0160948 A1 * 6/2012 DeMenezes ............ B60R 22/34
242/382.4

* cited by examiner

*Primary Examiner* — Sang K Kim
(74) *Attorney, Agent, or Firm* — Michael W. Starkweather

(57) ABSTRACT

A memory buckle assembly for use with an occupant restraint system includes a left inside case plate and a right inside case plate arranged within a rigid housing. The memory buckle assembly further includes an adjustable stop button and an adjustable memory button, operably mounted on the rigid housing, and configured to engage with a stop button configurator assembly and a memory button configurator assembly operably positioned between the left inside case plate and the right inside case plate within the rigid housing. The memory button configurator assembly is configurable using the adjustable memory button for enabling retention of a preset expanded position of the strap. The stop button configurator assembly is operably coupled to the memory button configurator assembly utilizing a spool gear and a memory gear to enable the expansion and retraction of the strap assisted by manual adjustments of the adjustable stop button.

17 Claims, 8 Drawing Sheets

BUCKLE ASSEMBLY

CROSS REFERENCE TO RELATED APPLICATIONS

Not applicable

FEDERALLY SPONSORED DEVELOPMENT

Not applicable.

MICROFICHE

Not applicable

BACKGROUND OF THE INVENTION

Field of the Invention

The present invention relates generally to buckle assemblies for use in straping usage, and more specifically, to a buckle assembly capable of presetting one or more desired extended positions of a strap or belt used in any known straping usage.

Description of the Related Art

Conventional belt webbing or a strap buckles includes a buckle base, a latch mechanism for releasably latching a tongue plate to an end of the buckle base, and a buckle cover for enclosing the latch mechanism. The buckle base is firmly secured to an object or to the body of an object. One commonly known object that uses a buckle system, but by far not the only object that uses a buckle system, is an automobile, which will be used in this disclosure for exemplary purposes only. In this exemplary case the vehicle occupant restraining system, through brackets, wires, or the like, and transmits a tensile load acting upon the webbing to the body of the automobile at the time a collision of automobiles is accidentally occurred. Further, the latch mechanism allows the tongue plate to be detachably coupled with the buckle base to thereby facilitate the fastening and releasing of the seat belt. When the tongue plate is inserted into the buckle base, a latching member prevents the tongue plate from being extracted by engaging a latching hole of the tongue plate.

Another type of seat belt system used in many applications such as the exemplary vehicles and other occupant restraint systems includes a length of seat belt webbing or a strap wound on a spool of a seat belt webbing or strap retractor. The seat belt webbing or strap is manually extensible about a vehicle occupant to strap around and protect the occupant. The spool rotates in a belt webbing or strap retractor withdrawal direction as the seat belt webbing or strap is withdrawn from the retractor. In the event of a hazardous event such as a vehicle collision, the spool is prevented from rotating in the belt webbing or strap withdrawal direction. The strap or the belt webbing around the front portion of the occupant prevents the sudden forward movement of the occupant in the event of an accident and thereby protects the occupant.

However, it is seen that, in existing safety belt buckle assemblies with a belt webbing or a strap wound on a spool or strap retractor, the occupants or the users have to manually pull the belt or the strap up to a desired length and lock the position of the strap using the locking device provided with the buckle assembly. After use, the users can simply disengage the strap from the locking device configured to attach with the extended strap from the buckle assembly. This enables the spool or the strap retractor to wind the belt back to its relaxed position. The above types of safety belt buckle assemblies employ several spring retraction systems and a separate manual locking device to extend, removably attach to the extended portion of the strap and for automated retraction of the strap when released from the locking means. However, the frequent users of such safety belt buckle assemblies, such as the ones installed in the user's vehicle, may have a safe and comfortable length for the extended strap. With the existing safety belt buckle assemblies, the users have to manually adjust the length of the strap each time to the desired length and secure using the locking means. There are several prior arts, which discloses one or more types of safety buckle assemblies having automated retraction systems and mechanical locking device for adjusting the length of the strap every time the user utilizes the buckle assembly. Accordingly, various prior arts have disclosed such related inventions, whereby the provided following patents and publications are herein incorporated by reference for their supportive teachings and enablement criteria for the technology needed to enable one skilled in the art to make and use the subject invention, in which:

U.S. Pat. No. 7,904,997 B2 discloses a buckle assembly for inflatable personal restraint systems. The buckle assembly includes a body and a latching mechanism carried by the body. The latching mechanism is configured to engage a corresponding tongue portion when the tongue is inserted into a front portion of the body. The buckle assembly also includes a cover operably coupled to the body and configured to pivotably move about an axis between a first position in which the latching mechanism engages the tongue and a second position in which the latching mechanism disengages the tongue. The buckle assembly further includes one or more counterweight components carried by the body and positioned such that the buckle assembly has a center of gravity between the front portion of the body and a vertical plane extending through the axis, and below a horizontal plane extending through the axis.

Another related prior art, U.S. Pat. No. 8,632,131 B2 discloses a tensioning apparatuses for occupant restraint systems and associated systems and methods. The occupant restraint system can be used in a vehicle and include a flexible web configured to extend across at least a portion of an occupant seated in the vehicle and an electrically actuated web retractor operably coupled to a proximal end portion of the web. The web retractor is configured to automatically wind and unwind the web. The system also includes an acceleration sensor operably coupled to the electrically actuated web retractor. The acceleration sensor is configured to send an electrical signal to the web retractor in response to a vehicle acceleration above a preset magnitude. In response to the signal, the web retractor is configured to retract the web, and/or at least temporarily prevent the web from moving inwardly or outwardly.

Another prior art, U.S. Pat. No. 5,873,599 A discloses an apparatus for pre-tensioning seat belt webbing. The pre-tensioning seat belt webbing is extensible about an occupant of a vehicle seat and has at least two different output levels. The sensors sense at least one characteristic of the occupant of the vehicle seat. A controller is operatively connected to the sensors for controlling the output level of the pre-tensioning apparatus based on the characteristics of the occupant sensed by the sensors. The at least two output levels of the pre-tensioning apparatus correspond to respective levels of force applied to the seat belt webbing, which in turn correspond to respective levels of force imposed on the vehicle occupant by the seat belt webbing.

Yet another prior art, U.S. Pat. No. 5,088,160 A relates to a seat belt webbing adjuster. The seat belt webbing adjuster is specifically adapted for use with aircraft passenger lap seat belts. The operation of the webbing adjuster by the passenger is the same as the typical prior-art webbing adjusters, but the manufacture and use of the adjuster and its load bar are improvements over the prior art. The seat belt webbing adjuster in this invention utilizes a load bar of unique shape, which provides a plurality of webbing pressure, or friction generating edges, which are able to grab and securely hold the webbing under severe load conditions. Some other prior arts such as the ones disclosed in U.S. Pat. Nos. 7,010,836 B2 and 6,868,585 B2 disclose web adjuster devices for use with a web or a belt for use in an occupant restraining system. In both the web adjuster device s a spring is utilized to maintain tension to the web or the belt and a web engaging device is utilized to engage with the web or the belt when it is kept in an extended position and in use.

The above prior arts disclose different types of buckle assemblies and some of which employs automated retraction mechanisms for automatically retracting the strap or the belts. In each of the above said systems and buckle assemblies, the users have to manually adjust and secure the desired length of the strap or the belt. After use, the users can disengage the strap and allow the automated retraction device associated with the buckle assembly to retract the strap to its normal position. Each time during use of the buckle assembly, the users need to stretch the strap to a desired length and secure the strap at the desired length using the securing or locking device associated with the buckle or using a separate engagement device configure to releasably attach to the strap or the belt. However, none of the above said systems and buckle assemblies do not include a device for allowing the users to set a desired length of the strap or belt. Hence there exists a need for an improved buckle assembly that would provide a device for the users to set a desired length of the strap or belt prior to its use. Further, the needed buckle assembly would be compact, easy to operate and with simple operating parts and operating mechanism to ensure easy maintenance and serviceability. Finally, the buckle assembly would be usable in many applications, like vehicles, satchels, bags, brief cases, luggage, packs, package holding systems, restraint systems of all types, and any other known or yet to be discovered device that could benefit from the use of a memory position strapping system.

SUMMARY OF THE INVENTION

In view of the foregoing disadvantages inherent in the known types of systems like in the prior arts, the present invention provides a memory buckle assembly for use with any strap using system. The memory buckle assembly includes a rigid housing having a left outside casing and a right outside casing, each having a bottom covering portion, a side covering portion and a top covering portion configured to be removably coupled to define an interior space for operably housing a number of components including a strap. The rigid housing further houses a left inside case plate configured to fit inside the left outside casing and a right inside case plate configured to fit inside the right outside casing, both arranged in parallel and spaced apart to accommodate the components including the strap. An adjustable stop button and an adjustable memory button, both arranged in parallel axes, mounted between the left inside case plate and the right inside case plate. A stop button configurator assembly is operably positioned between the left inside case plate and the right inside case plate and arranged in such as way to be manually configurable using the adjustable stop button for adjusting a position of the strap during an expansion and a retraction of the strap. Further a memory button configurator assembly is operably positioned between the left inside case plate and the right inside case plate, parallel to the arrangement of the stop button configurator assembly, and made configurable using the adjustable memory button for enabling retention of a preset expanded position of the strap. A user can extend a strap stored in the memory buckle assembly, which operates the stop button configurator assembly operably coupled to the memory button configurator assembly utilizing a spool gear and a memory gear to enable the expansion and retraction of the strap assisted by manual adjustments of the adjustable stop button and manual presetting of an expanded position of the strap utilizing the adjustable memory button.

According to one embodiment of the present invention, a method of operating the present memory buckle assembly includes the steps of providing the holding system utilizing the present memory buckle assembly. A user can disengage the adjustable memory button and the adjustable stop button at the complete retracted position of the strap. Now the user can extend the strap manually up to a desired length and can engage the adjustable memory button to preset the desired length of the strap for next use. Then the user can engage the adjustable stop button to secure the position of the strap prior to or after fixing the strap to a fastening a locking device associated with the occupant restraining system. The user can release or disengage the adjustable stop button, after use of the occupant restraining system to allow automatic retraction of the strap within the rigid housing of the memory buckle assembly. The adjustable memory button is kept in the engaged position during this time. During next use of the memory buckle assembly, the users can extend the strap just beyond the preset length of the strap and can release the strap to get automatically get stopped at the present desired length of the strap. Once the strap gets automatically stopped at the preset length, the user can engage the adjustable stop button and secure the position of the strap.

Thus a primary feature of the present invention is to provide a memory buckle assembly to allow users to preset a desired length of the strap for future use.

Another feature of the present invention is to provide a memory buckle assembly to allow users to automatically set a desired and comfortable length of the strap without the hassle and time consuming manual strap adjustment during each time of use of the device.

Another feature of the present invention is to provide a memory buckle assembly having a compact size and shape with stored strap for holding systems.

These together with other features of the invention, along with the various features of novelty, which characterize the invention, are pointed out with particularity in the disclosure. For a better understanding of the invention, its operating advantages and the specific objects attained by its uses, reference should be had to the accompanying drawings and descriptive matter in which there are illustrated preferred embodiments of the invention. In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

BRIEF DESCRIPTION OF THE DRAWINGS

To further clarify various aspects of some example embodiments of the present invention, a more particular description of the invention will be rendered by reference to specific embodiments thereof that are illustrated in the appended drawing. It is appreciated that the drawing depicts only illustrated embodiments of the invention and are therefore not to be considered limiting of its scope. Elements in the figures have not necessarily been drawn to scale in order to enhance their clarity and improve understanding of these various elements and embodiments of the invention. Furthermore, elements that are known to be common and well understood to those in the industry are not depicted in order to provide a clear view of the various embodiments of the invention, thus the drawings are generalized in form in the interest of clarity and conciseness. The invention will be described and explained with additional specificity and detail through the use of the accompanying drawing in which.

DETAILED DESCRIPTION OF THE INVENTION

Figure 1:
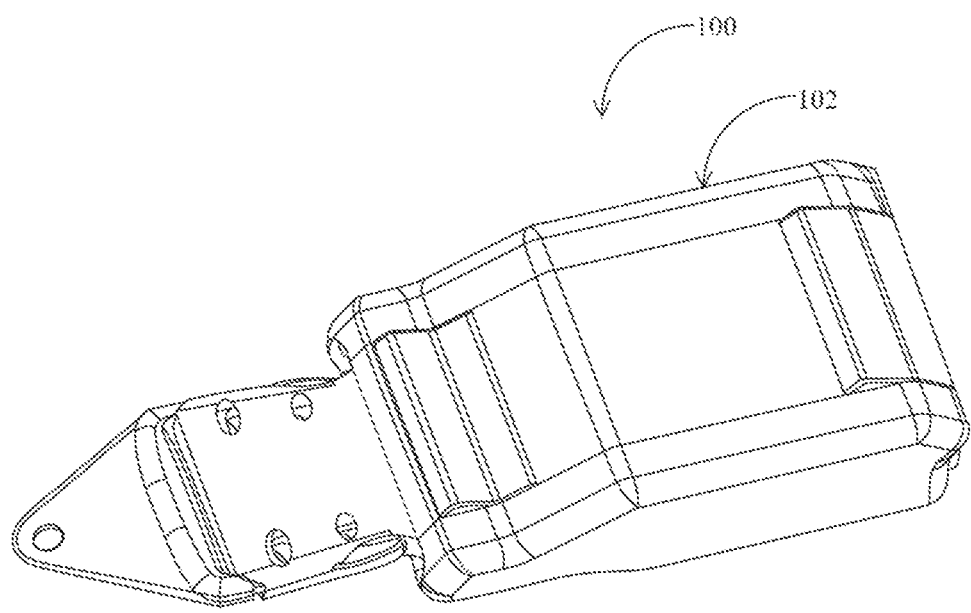
FIG. 1 illustrates a perspective view showing a memory buckle assembly for use with a holding system, according to a preferred embodiment of the present disclosure.

In the following discussion that addresses a number of embodiments and applications of the present invention, reference is made to the accompanying drawings that form a part hereof, and in which is shown by way of illustration specific embodiments in which the invention may be practiced. It is to be understood that other embodiments may be utilized and changes may be made without departing from the scope of the present invention. The embodiments of the present disclosure described below are not intended to be exhaustive or to limit the disclosure to the precise forms disclosed in the following detailed description. Rather, the embodiments are chosen and described so that others skilled in the art may appreciate and understand the principles and practices of the present disclosure.

Further, various inventive features are described below that can each be used independently of one another or in combination with other features. However, any single inventive feature may not address any of the problems discussed above or only address one of the problems discussed above. Further, one or more of the problems discussed above may not be fully addressed by any of the features described below. The following embodiments and the accompanying drawings, which are incorporated into and form part of this disclosure, illustrate one or more embodiment of the invention and together with the description, serve to explain the principles of the invention. To the accomplishment of the foregoing and related ends, certain illustrative aspects of the invention are described herein in connection with the following description and the annexed drawings. These aspects are indicative, however, of but a few of the various ways in which the principles of the invention can be employed and the subject invention is intended to include all such aspects and their equivalents. Other advantages and novel features of the invention will become apparent from the following detailed description of the invention when considered in conjunction with the drawings.

LIST OF TECHNICAL TERMS AND REFERENCE NUMERALS

The following technical terms and corresponding reference numerals are used throughout the description and the above listed figures of the present disclosure.
Memory buckle assembly 100
Rigid housing 102
Left outside casing 104a
Right outside casing 104b
Left inside case plate 106
Right inside case plate 108
Adjustable stop button 110
Adjustable memory button 112
Memory screw 114
Memory indicator 116
Memory nut 118
Memory spring 120
Memory gear 122
Spool gear 124

Clock spring 126
Spool device 128
Fastening device 130
Strap 132
Protruded portion on the side surface of memory indicator 134
Chamfered edge on the side surface of memory indicator 136
Projected portion on the side surface of the memory nut 138

The present invention relates to a memory buckle assembly for use in a variety of devices and applications, such as, but not limited to, in occupant restraint systems in vehicles and other seating arrangements, according to one or more embodiment of the illustrated invention. The present memory buckle assembly includes a compact mechanical operating mechanism enclosed in a rigid housing, which can be attached to the body or to the seats of the vehicles and other occupant restraint systems. The present memory buckle assembly includes the strap or the belt or the webbing means, operably placed inside the rigid housing around a spool. In an occupant restraint system installed with the present memory buckle assembly, the users can manually pull a part of the strap, extending outside the rigid housing, to extend or unwind the strap to a desired length and can then engage the strap to a latching device or an engaging device configured to attach with the extended end of the strap. The present memory buckle assembly includes a user operable stop button that allows the users to secure the strap and to maintain a desired length of the strap after extending the strap from the spool device placed inside the rigid housing. The present memory buckle assembly further includes a memory button, which engages with a memory button configurator assembly that consists of a number of interconnected mechanical parts capable of operating together, for allowing the users to preset a desired length of the extended strap during the use of the memory buckle assembly. This feature of the present memory buckle assembly is highly useful to regular occupants of an occupant restraint systems such as the ones installed in vehicles. The present memory buckle assembly enables the regular users to extend the strap up to a desired, comfortable length and engage the memory button to set that particular position or length of the strap. Then the user can operate the memory buckle assembly as usual by extending the strap, securing the strap by engaging the stop button and disengaging the stop button to retract the strap automatically into the rigid housing, keeping the memory button in an engaged or locked position. Once the memory button is set at a desired length of the strap, the user can extend the strap up to any desired length and release it to automatically stop at the previously set length using the memory button. This allows the users to set any desired, comfortable length of the strap once and can easily adjust the strap to automatically set at the previously set desired length. In some instances, some other users using the present memory buckle assembly may have a different desired length for the strap. In such instances, the users can extend the strap manually to their individual desired length and lock using the stop button means. The detailed operation of the memory button configurator assembly and the associated parts housed in the rigid housing is discussed below with the help of relevant drawings.

Referring now to FIG. 1, there is a perspective view showing the memory buckle assembly 100 for use with an occupant restraint system, according to a preferred embodiment of the present disclosure. The memory buckle assembly 100 is compact and the mechanical components are operably placed inside the rigid housing 102. In an embodiment, the rigid housing 102 of the present memory buckle assembly 100 includes a top covering portion, a bottom covering portion and a pair of side covering portions. Each portion of the rigid housing 102 is removably coupled to define an interior space for operably housing the components or parts of the memory buckle assembly 100 including the strap. In some instances, the rigid housing 102 of the memory buckle assembly 100 is attached with a fastening device 130 to attach with a body of the vehicle or to the seat of the occupant. In some other instances, the fastening device 130 is attached to the bottom covering portion of the rigid housing 102 and extends in a direction opposite to the opening of the rigid housing 102 for releasing the extended strap. In one or more embodiment, the rigid housing is made from durable, non-corrosive materials including metals such as aluminum and alloys and in some instances, uses a combination of durable plastic material and metal for providing rigidity and strength to the rigid housing 102. In some other embodiment, the rigid housing 102 is made from a single metallic enclosure or by attaching a number of rigid components.

Figure 2:
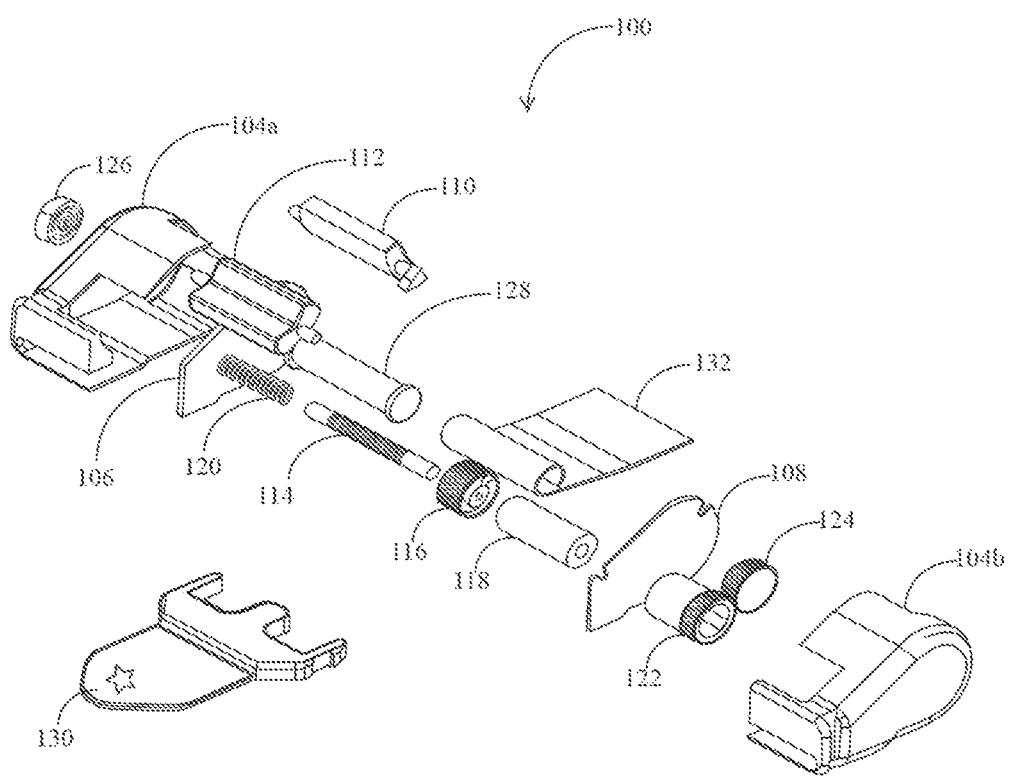
FIG. 2 is a disassembled view of a number of internal parts of the memory buckle assembly for use with a holding system, according to a preferred embodiment of the present invention.

Turning now to FIG. 2, there is a disassembled view showing the internal parts or components of the memory buckle assembly 100 for use with an occupant restraint system, according to a preferred embodiment of the present invention. The rigid housing 102 of the memory buckle assembly 100 operably house all the components or parts. The memory buckle assembly 100 for use with the occupant restraint systems includes a left outside casing 104a and a right outside casing 104b, each having a bottom covering portion, a side covering portion and a top covering portion. In some embodiment, the left outside casing 104a and the right outside casing 104b forms a part of the rigid housing 102. The left outside casing 104a and the right outside casing 104b, each includes an interior space and are prefabricated or preconfigured to couple or attach together defining an interior space sufficient to operably house the other internal parts or components of the memory buckle assembly 100. The memory buckle assembly 100 further includes a left inside case plate 106 configured to fit inside the left outside casing 104a and a right inside case plate 108 configured to fit inside the right outside casing 104b. The left inside case plate 106 is a metallic plate provided with grooves and openings and has a shape and dimension to fit inside the interior space created within the left outside casing 104a. Similarly, the right inside case plate 108 is a metallic plate provided with grooves and openings and has a shape and dimension to fit inside the interior space created within the right outside casing 104b. In a preferred embodiment, the left outside casing 104a and the right outside casing 104b is molded or fabricated with mechanical guides or provisions to accommodate the left inside case plate 106 and the right inside case plate 108 so that both the left and right inside case plates 106, 108 are placed parallel and spaced apart from each other. In a certain embodiment, the parallel left inside case plate 106 and the right inside case plate 108, spaciously arranged within the left outside casing 104a and the right outside casing 104b, is provided with a pair of grooves on the top edge and a pair of openings along a pair of parallel lines connecting the grooves and the openings. In an embodiment, the left outside casing 104a and the right outside casing 104b enables the users to easily enclose the components or parts of the memory buckle assembly 100.

The memory buckle assembly 100 further includes an adjustable stop button 110 operably mounted between the left inside case plate 106 and the right inside case plate 108.

The adjustable stop button 110 is configured to be controlled manually between two positions such as an "engaged" or closed position and a "disengaged" or open position for securing a position of the expanded strap or the belt. The users can expand the strap or the belt by keeping the adjustable stop button 110 in the open or disengaged position and manually pulling the belt or the strap until the desired length of the strap or belt is attained. Once the desired length of the strap or the belt is achieved, the users can manually turn the adjustable stop button 110 to the closed or engaged position to secure or fix the extended length of the strap or the belt. In a preferred embodiment, the adjustable stop button 110 is operably placed on the rigid housing 102 of the memory buckle assembly 100 to enable the users to easily access and adjust the position of the strap or the belt wound and stored within the rigid housing 102.

The memory buckle assembly 100 further includes an adjustable memory button 112 operably mounted between the left inside case plate 106 and the right inside case plate 108. The adjustable memory button 112 is user accessible and placed on the rigid housing 102 of the memory buckle assembly 100 to allow the users to adjust between an "engaged" or closed position and a "disengaged" or open position. The adjustable memory button 112 enables the users to preset or mechanically store a desired position of the extend belt or the strap wound within the rigid housing. The users can pull or extend the strap or the belt up to a desired length and can then engage the adjustable memory button 112 to mechanically store or preset the desired position of the strap or the belt for next time use. On subsequent uses of the strap or the belt associated with the memory buckle assembly 100, the users can simply extend the strap or the belt from within the rigid housing 102 of the memory buckle assembly 100, and can be released after extending beyond the preset length, to automatically lock or set the strap or the belt at the preset desired length of the strap or the belt. Once the preset desired length of the strap or the belt is automatically set using the adjustable memory button 112, the users can proceed with the normal engaging or closing operation using the adjustable stop button 110 operably mounted on the rigid housing 102. In some instances, the engagement of the adjustable memory button 112 to automatically set the preset desired length of the strap or the belt helps the frequent user of the memory buckle assembly 100 to save time during the routine adjustment of the strap to obtain the comfortable, desired length of the strap.

The memory buckle assembly 100 also includes a stop button configurator assembly, which consists of a number of components operably positioned between the left inside case plate 106 and the right inside case plate 108. The components of the stop button configurator assembly are interconnected and are configurable using the adjustable stop button 110 for adjusting a position of the strap during the expansion and the retraction of the strap or the belt wound inside the rigid housing 102 of the memory buckle assembly 100. In an embodiment of the present invention, the stop button configurator assembly includes a spool device 128 having a first end, a second end and an elongated center portion operably positioned along a first axis inside the rigid housing 102, between the left inside case plate 106 and the right inside case plate, for winding the strap 132 around the elongated center portion. A clock spring 126 is operably attached to the first end of the spool device 126 and positioned outside the left inside case plate 106. The second end of the spool device 128 is attached to a spool gear 124. The rotation of the spool device 128 enables expansion of the strap 132 and a rotation of the clock spring 126 enables automated retraction of the strap 132 using the clock spring 126 is operably attached to the first end of the spool device 128. When a user pulls to expand the strap 132, the spool device 128 and the attached spool gear 124 and the clock spring 126 is rotated. The clock spring 126 is a spiral ring and is attached outside the left inside case plate 106 and positioned within the rigid housing 102. When the user pulls or expands the strap 132 the clock spring 126 gets compressed and the spool device 128 is rotated to unwind the strap 132. Once the user releases the strap 132 it automatically rotates the spool device 128 to rotate back to wind the strap 132 back around the elongated center portion of the spool device 128.

The memory buckle assembly 100 further includes a memory button configurator assembly, which consists of a number of components operably positioned between the left inside case plate 106 and the right inside case plate 108. The components of the memory button configurator assembly are interconnected and are configurable using the adjustable memory button 112 for enabling retention of a preset expanded position of the strap 132 during the expansion and the retraction of the strap or the belt 132 wound inside the rigid housing 102 of the memory buckle assembly 100. In an embodiment of the present invention, the memory button configurator assembly includes a memory screw 114 having a first end, a threaded elongated portion and a second end placed along a second axis parallel to the first axis of the memory buckle assembly 100. A memory indicator 118 is movably coupled to the threaded elongated portion of the memory screw 114. The memory indicator 118 is configured to move around the memory screw 114 in a forward and a backward direction along the second axis of the memory buckle assembly 100. The memory button configurator of the memory buckle assembly 100 further includes a memory nut 118 operably coupled to the threaded elongated portion of the memory screw 114 to rotatably move in the forward and the backward direction along the second axis of the memory screw 114. A memory spring 120 is provided around the memory screw 114 that is capable of pushing the memory indicator 116 to the memory nut 118 along the second axis i.e. through the threaded elongated portion of the memory screw 114, during the expansion and retraction of the strap 132. The memory button configurator of the memory buckle assembly 100 further includes a memory gear 122 having a hollow elongated portion and a gear head rotatably fixed to the right inside case plate 108. The hollow interior of the hollow elongated portion is provided with a locking device in form of a flat surface in the inside cylindrical surface of the hollow elongated portion configured to receive the other operating component such as the memory nut 118. The outside cylindrical surface of the memory nut 118 is also provided with a flat portion to engage with the flat surface provided inside the cylindrical surface of the hollow elongated portion of the memory gear 122. The memory gear 122 is rotatably attached to the right inside case plate 108 of the rigid housing 102 and a rotation of the memory gear 122 enables the forward and backward movement of the memory nut 118 placed inside the memory gear 122.

Figure 3A:
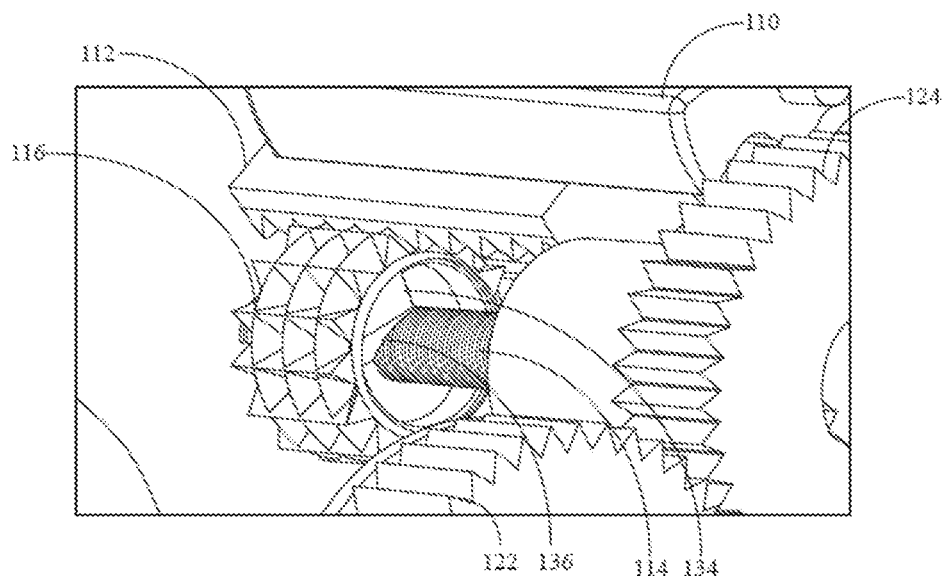
FIG. 3A shows a perspective view of the memory indicator and the memory nut of the memory buckle assembly, respectively, according to one embodiment of the present invention.
Figure 3B:
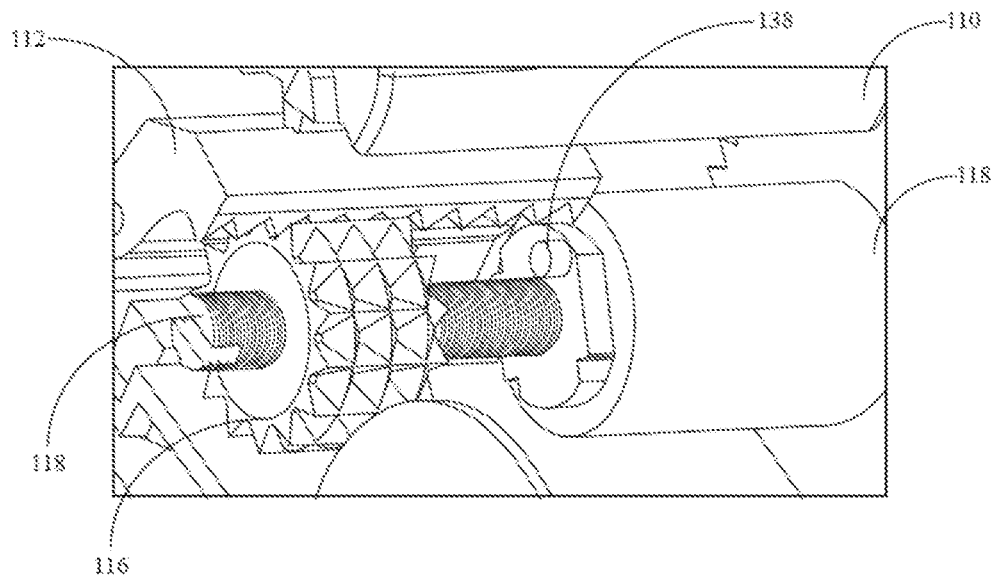
FIG. 3B shows a perspective view of the memory indicator and the memory nut of the memory buckle assembly, respectively, according to one embodiment of the present invention.

Turning now to FIG. 3A and FIG. 3B, there is shown perspective views of the memory indicator 116 and the memory nut 118 of the memory buckle assembly 100, respectively, according to a preferred embodiment of the present invention. The memory indicator 116 and the memory nut 118 of the memory buckle assembly 100 are provided with a mechanical locking means, made operable using the components of the memory button configurator assembly, that would allow the users to preset the desired length of the strap 132 as discussed in the earlier paragraphs, according to one or more embodiment of the present invention. FIG. 3A shows the locking arrangements on the memory indicator 116 that enable the users to preset the desired length of the strap 132 according to one or more embodiment of the present invention. The memory indicator 116 includes a top cylindrical surface having a number of engaging device or teeth for removably engaging with the adjustable memory button 122. The memory indicator 116 further includes a circular inner surface, which in some instance are recessed and is configured to move in a forward and backward direction over the elongated threaded portion of the memory screw 114. The recessed, circular inner surface of the memory indicator 116 is also provided with a protruded portion 134 provided on a side surface for removably engaging with the memory nut 118. The recessed, circular inner surface of the memory indicator 116 is also provided with a chamfered portion 136, leading to the protruded portion 134 provided on the side surface, for allowing an automated disengagement, or sliding over of a side surface of the memory nut 118 and thereby enabling rotation of the memory nut 118 to allow the expansion of the strap 132. The protruded portion 134 and the chamfered portion 136 provided on the side surface of the memory indicator 116 enables a locked movement and a separated movement of the memory indicator 116 and the memory nut 118 during the expansion and retraction of the strap 132.

FIG. 3B shows the locking arrangements on the memory nut 118 that enable the users to preset the desired length of the strap 132, according to one or more embodiment of the present invention. The memory nut 118 includes a top cylindrical smooth surface having a dimension configured to move inside and out of the hollow elongated portion of the memory gear 122. The memory nut 118 also includes a circular inner surface configured to move in a forward and backward direction over the threaded elongated portion of the memory screw 114. Further, a side surface of the memory nut 118 is provided with one or more projected portions 138, such as in the shape of a small cylinder protruding outside the side surface of the memory nut 118 and facing the side surface of the memory indicator 116. In a preferred embodiment, the projected portions 138 provided on the side surface of the memory nut 118 and facing the side surface of the memory indicator 116 is configured to engage with the protruded portion 134 provided on the side surface of the memory indicator 116. The projected portion 138 provided on the side surface of the memory nut 118, facing the side surface of the memory indicator 116, is configured to slide over the chamfered portion 136 provided on the side surface of the memory indicator 116 during a backward movement of the memory indicator 116 and the memory nut 118, i.e., during the expansion of the strap wound around the spool device 128. Thus the projected portion 138 on the side surface of the memory nut 118 and the protruded portion 134 and the chamfered portion 136 provided on the side surface of the memory indicator 116 enables the locked movement and the separated movement of the memory indicator 116 and the memory nut 118, respectively, during the expansion and retraction of the strap 132.

Focusing now on FIG. 4A, 4B, 4C and FIG. 4D, there are schematic diagrams showing an operation of the memory buckle assembly 100 when in use, according to a preferred embodiment of the present invention. The operation of the present memory buckle assembly 100 is explained in four steps or stages. In a first step, the strap or the belt 132 wound around the spool device 128 of the stop button configurator assembly, positioned within the rigid housing 102, is kept in a relaxed or retracted position. In the retracted position of the strap 132, the adjustable stop button 110 and the adjustable memory button 112 are kept in an open position or a disengaged position, as in FIG. 4A. The memory spring 120 placed near the left side case plating 106 pushes the memory indicator 116 and the memory nut 118 towards the hollow interior of the memory gear 122 operably attached to right side case plating 108. In this instance, the memory spring 120 pushes the memory indicator 116, which in turn pushes the memory nut 118 to, almost completely inside, the hollow interior of the memory gear 122. The adjustable stop button 110 and the adjustable memory button 112 are provided with a locking head and are configured to engage with the teeth provided on the outer cylindrical surface of the spool gear 124 and the memory gear 122, receptively. In a relaxed or retracted position of the strap 132 as in FIG. 4A, the locking heads of the adjustable stop button 110 and the adjustable memory button 112, manually placed in the open or disengaged position, are kept a certain distance apart from the teeth provided on the outer cylindrical surface of the spool gear 124 and the memory gear 122, receptively.

A second step in the operation of the memory buckle assembly 100 starts when the user pulls or expands the strap 132. In case of an occupant restraint system, the users pull the strap 132 or the belt for fastening around the front part of the body of the user. The users first ensure that the adjustable stop button 110 and the adjustable memory button 112 are in the open position, and pull the strap 132 to a desired length prior to fastening. When the user pulls the strap 132, the strap 132 gets unwounded from the elongated center portion of the spool device 128, compressing the clock spring 126 and rotating the spool gear 124. The rotation of the spool gear 124 enables the rotation of the coupled memory gear 122, which is engaged with the spool gear 124 outside the right inside case plate 108, as in FIG. 4B. The parallel, mutual engaged arrangement of the spool gear 124 and the memory gear 122 enables rotation of the memory gear 122 in a direction, opposite to the direction of rotation of the spool gear 124, during the unwinding of the strap 132. The rotation of the memory gear 122 enables rotation of the memory nut 118, which is coupled with the hollow interior of the memory gear 122. The memory nut 118 rotates over the threaded elongated portion of the memory screw 114 in a backward direction, as in FIG. 4B. The memory nut 118 pushes the memory indicator 116 backwards through the threaded elongated portion of the memory screw 114 against the memory spring 120 and the left side case plate 106. Once the desired length of the strap 132 is reached, the user can engage the adjustable stop button 110 to secure or fix the position of the strap at the desired length. Engaging the adjustable stop button 110 enables the head of the adjustable stop button 110 to engage with the teeth provided on the outer surface of the spool gear 124 to stop the movement of the strap 132 wound around the spool device 128 and associated components and the memory gear 122 coupled to the spool gear 124.

Figure 4A:
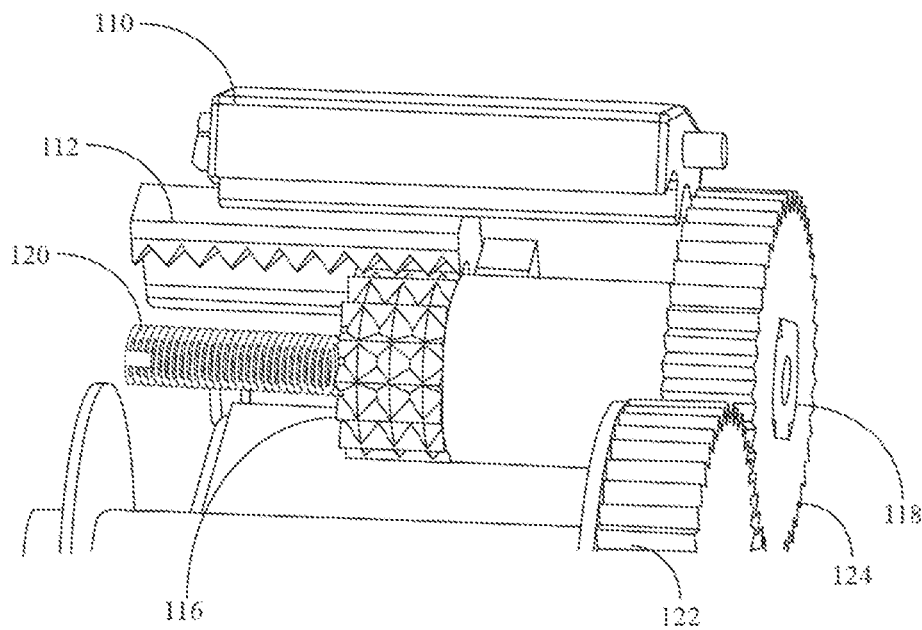
FIG. 4A is a schematic diagrams showing an operation of the memory buckle assembly when in use, according to one embodiment of the present invention.
Figure 4B:
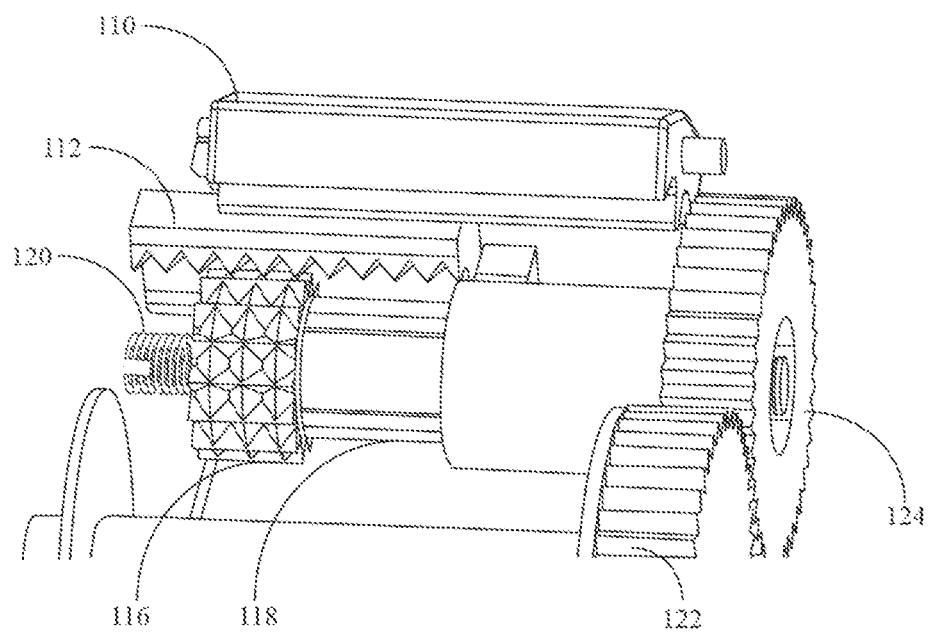
FIG. 4B is a schematic diagrams showing an operation of the memory buckle assembly when in use, according to one embodiment of the present invention.
Figure 4C:
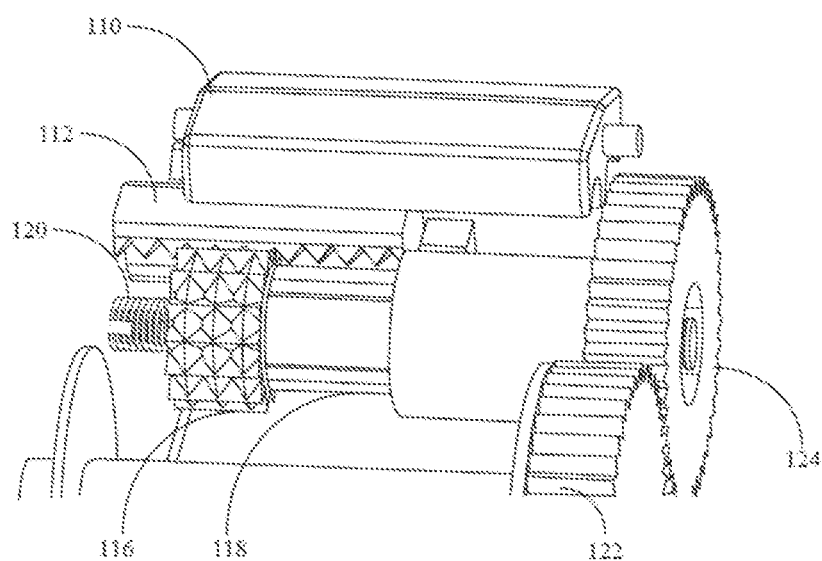
FIG. 4C is a schematic diagrams showing an operation of the memory buckle assembly when in use, according to one embodiment of the present invention.
Figure 4D:
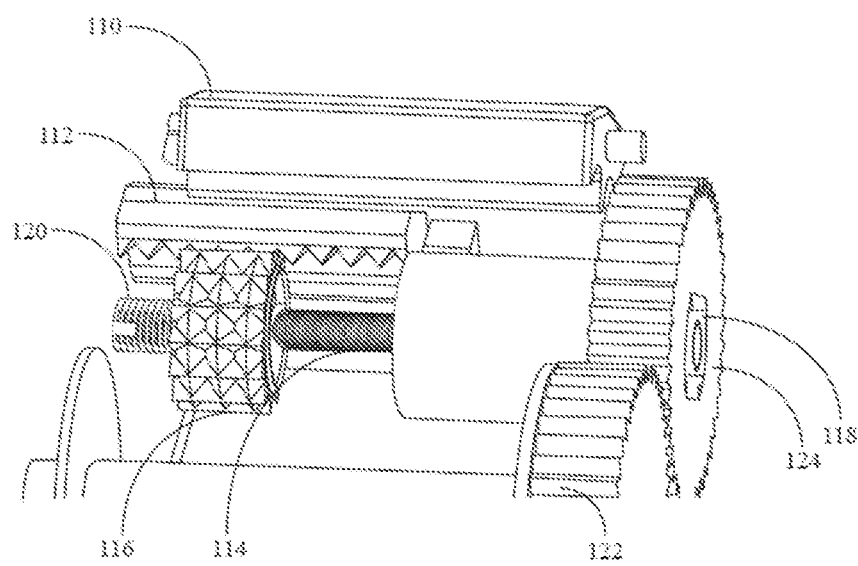
FIG. 4D is a schematic diagrams showing an operation of the memory buckle assembly when in use, according to one embodiment of the present invention.

A third step in the operation of the memory buckle assembly 100 starts when the user pulls or expands the strap 132 and engages the adjustable stop button 110 to secure the extended position of the strap 132. In case of the occupant restraint system, the users pull the strap 132 or the belt to the desired comfortable length for fastening around the front part of the body of the user. After securing the position of the desired, comfortable length of the extended strap using the adjustable stop button 110, the users can preset that desired, comfortable length of the expanded strap 132 for future use utilizing the adjustable memory button 112. The users can engage the adjustable memory button 112 as shown in FIG. 4C. The adjustable memory button 112 has a number of locking teeth configured to engage with the teeth provided on the cylindrical surface of the memory indicator 116, as in FIG. 4C. When the user engages the adjustable memory button 112, the adjustable memory button 112 changes its position to engage with the teeth on the memory indicator 116, thereby preventing the further movement of the memory indicator 116 and the associated memory spring 114 over the memory screw 114. In some embodiment of the present invention, the adjustable memory button 112 of the memory buckle assembly 100 is first engaged after extending a desired length of the strap 132, followed by the engagement or closing or securing the position of the strap 132 using the of the adjustable stop button 110. Setting the adjustable memory button 112 prior to the engagement of the adjustable stop button 110 would not limit the expansion of the strap 132, as the spool gear 124, the associated spool device 128 and the clock spring 126 can further operate to allow the extension of the strap 132.

A fourth step in the operation of the memory buckle assembly 100 starts when the user disengages the adjustable stop button 110 to release the extended strap 132, keeping the adjustable memory button 112 in the previously set engaged position. When the user disengages the adjustable stop button 110, the part of the adjustable stop button 110 to engage with the teeth on the surface of the spool gear 124 is lifted to enable the movement of the spool gear 124 in an opposite direction. The clock spring 126 under tension enables automated rotation of the coupled spool device 128 and the spool gear 124 in the opposite direction to automatically retract the strap around the elongated middle portion of the spool device 128. The rotation of the spool gear 124 enables the coupled memory gear 122 to rotate in an opposite direction of the spool gear 124. The rotation of the spool gear 124 enables the movement of the memory nut 118 over the threaded portion of the memory screw 114 in a forward direction as in FIG. 4D, opposite to the direction of the movement of the memory nut 118 discussed in the first step. Once the strap 132 is completely retracted within the rigid housing 102, around the spool device 128, the memory nut 118 gets automatically moved to the far right portion of the rigid housing 102 near the right inside case plate 108. The position of the memory indicator 116 is kept locked using the adjustable memory button 112, keeping the memory string compressed between the left inside case plate 106 and the memory indicator 116.

In a fifth step, the user pulls or expands the strap 132, keeping the adjustable memory button 112 in the locked or engaged position and the adjustable stop button 110 in a disengaged position, for next use until a desired length. When the user extends the strap 132, the spool device 128 is rotated along with the coupled clock spring 126 and the spool gear 124 in the same direction as in the first step. The rotation of the spool gear 124 enables rotation of the coupled memory gear 122 in the opposite direction. The rotation of the memory gear 122 enables the rotation and the backward movement of the memory nut 118 as discussed in the first step. The memory nut 118 moves backwards over the threaded portion of the memory screw 114 towards the locked position of the memory indicator 116. The continuous extension of the strap 132 enables the memory nut 118 to reach the memory indicator 116 over the threaded portion of the memory screw 114. Now, referring back to the FIG. 3A and FIG. 3B, when a side surface of the memory nut 118 reaches the side surface of the memory indicator 116, the chamfered surface 136 provided on the side surface of the memory indicator 116 enables the projected portion 138 on the side surface of the memory nut 118 to slide over during further rotations. In some instances, the projected portion 138 on the side surface of the memory nut 118 first comes in contact with the chamfered surface 136 provided on the side surface of the memory indicator 116, which pushes against the projected portion 138 on the side surface of the memory nut 118 during each rotation to slide over the protruded portion 134 on the side surface of the memory indicator 116. This allows the users to notice the jerks in the strap movement while extending thereby realizing the preset position of the strap 132. Thus the chamfered surface 136, the protruded portion on the side surface of the memory indicator 116 and the projected portion 138 on the side surface of the memory nut 118 notify the user that the length of the strap 132 has reached just beyond the preset length of the strap 132, set using the adjustable memory button 112.

Once the user extends the strap to a particular length, just beyond the length preset length of the strap 132, he/she can release the strap 132 without locking the position of the strap 132 using the adjustable stop button 110. This causes the rotation of the spool gear 124 in the opposite direction, as in the fourth step, enabled by the clock spring 126. The automated retraction of the strap 132 using the clock spring 126 enables the rotation of the memory gear 122 in the opposite direction of rotation of the spool gear 124 and thereby enabling the rotation of the memory nut 118 in the opposite direction over the memory screw 114. When the memory nut 118 in contact with the side surface of the memory indicator 116, starts to rotate in the opposite direction, the protruded portion 134 on the side surface of the memory indicator 116 engages with the projected portion 138 provide on the side surface of the memory nut 118. This prevents the further movement and rotation of the memory nut 118 in the forward direction and thereby blocks the rotation of the memory gear 122. When the rotation of the memory gear 122 is blocked, the rotation of the coupled spool gear 124 also gets blocked, which in turn automatically prevents the rotation of the coupled spool device 128 and the clock spring 126. Hence the unwinding of the strap 132 from the elongated center portion of the spool device 128 is also blocked using the adjustable memory button 112. The strap 132 gets automatically stopped at the preset extended length of the strap 132 utilizing the present memory buckle device 100. This allows the users to preset a desired and comfortable length of the strap 132 in occupant restraint systems employing the present memory buckle device 100. The users only need to extend the strap 132 just beyond the preset position of the strap 132, which becomes evident to the users by feeling or noticing the jerks during the extension or expansion of the strap 132, and release the strap 132 to get automatically get locked at the preset desired length of the strap 132. Once the strap 132 gets automatically locked at the present length, the user can then engage the adjustable stop button to fix the position of the strap 132. The present memory buckle assembly 100 further allows the users to set different comfortable length or memory positions of the strap 132 by disengaging the adjustable memory button 112 and following the above said steps, i.e. from the first to the fifth step.

Figure 5A:
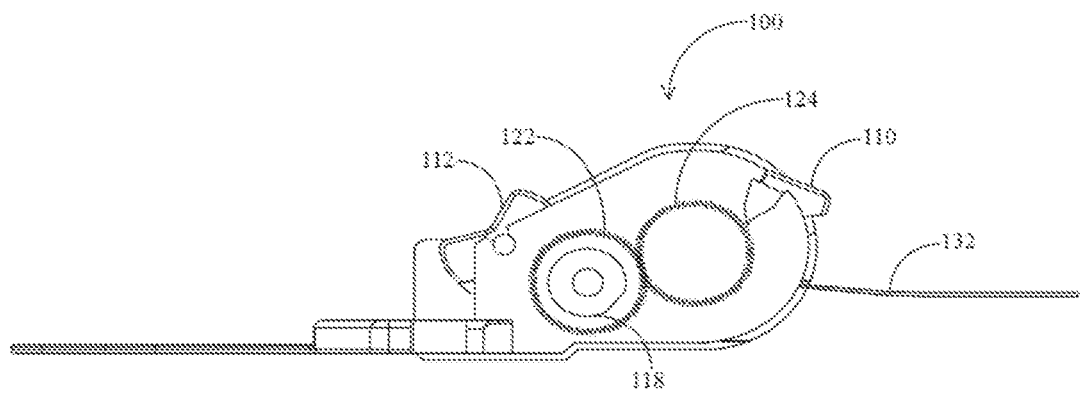
FIG. 5A shows the side view and corresponding perspective view of the memory buckle assembly with the strap in an expanding position, according to one embodiment of the present invention.
Figure 5B:
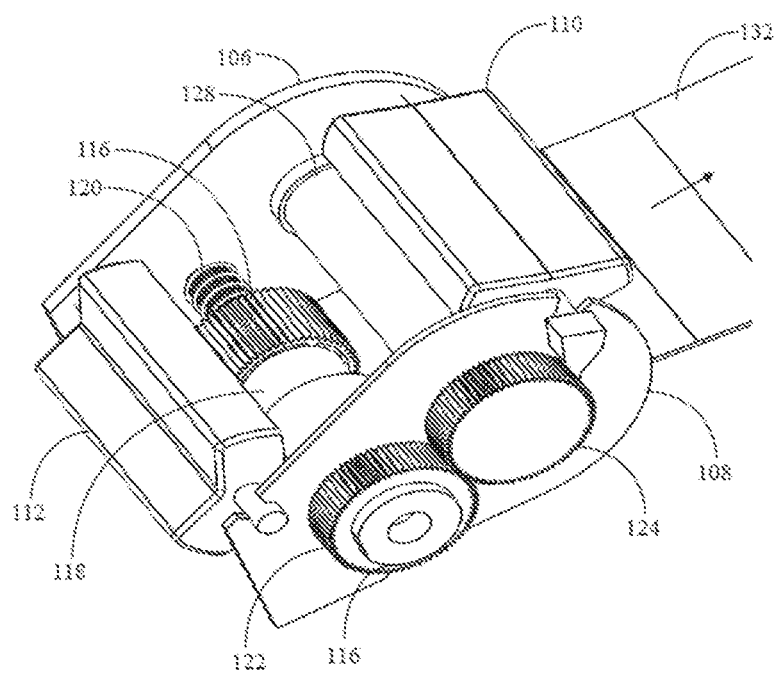
FIG. 5B shows the side view and corresponding perspective view of the memory buckle assembly with the strap in an expanding position, according to one embodiment of the present invention.

The disclosure will now focus on FIG. 5A and FIG. 5B, which shows the side view and corresponding perspective view of the memory buckle assembly 100 with the strap 132 in an expanding position, according to a preferred embodiment of the present invention. As discussed in the above paragraphs, the expanding of the strap 132, with no present memory position or desired length of the strap 132, is performed with the open or disengaged position of the adjustable memory button 112 and the adjustable stop button 110 as discussed in the first step in the above paragraphs. The user can manually extend the strap 132 to any desired length and engage the adjustable memory button 112 to set the desired length position using the memory indicator 116. Once the desired length is set, the user can then engage the adjustable stop button 110 to fix the position of the strap 132.

Figure 6A:
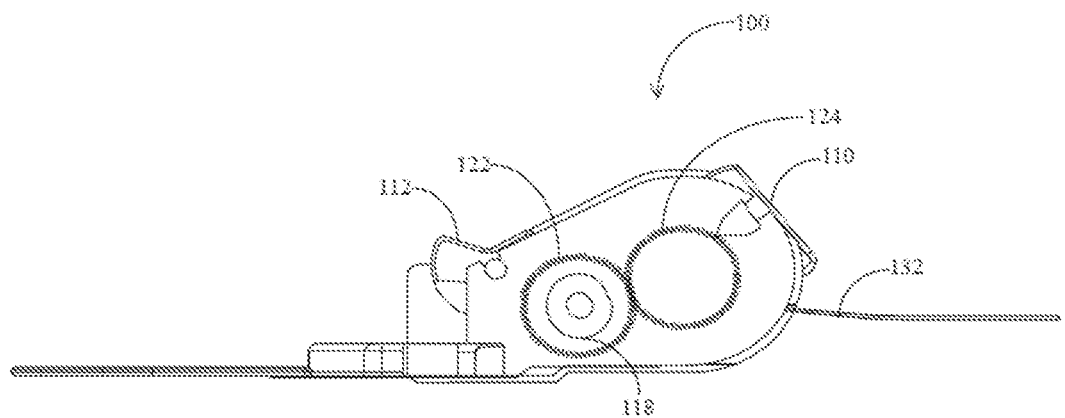
FIG. 6A shows the side view and corresponding perspective view of the memory buckle assembly with the strap in a retracting position, according to one embodiment of the present invention.
Figure 6B:
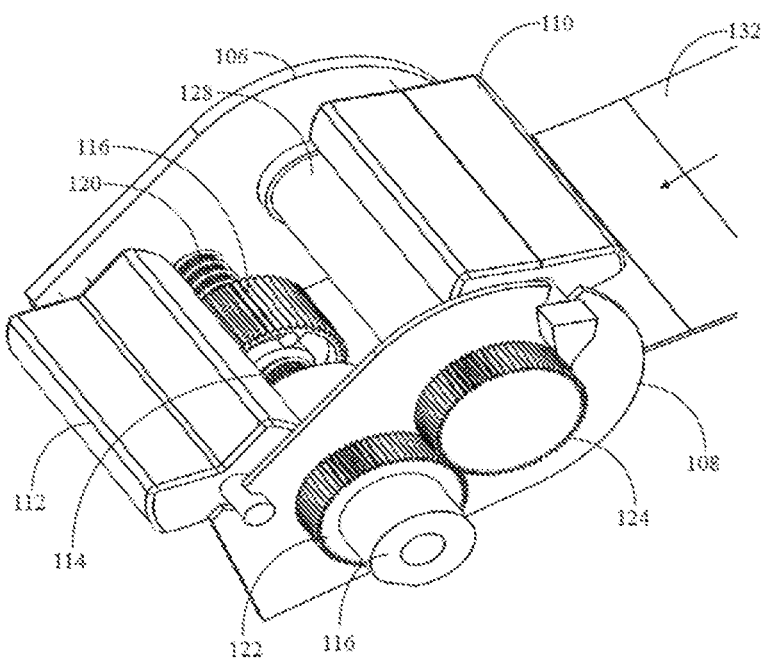
FIG. 6B shows the side view and corresponding perspective view of the memory buckle assembly with the strap in a retracting position, according to one embodiment of the present invention.

Now turning to FIG. 6A and FIG. 6B, they show the side view and corresponding perspective view of the memory buckle assembly 100 with the strap 132 in a retracting position, according to a preferred embodiment of the present invention. After use of the memory buckle assembly 100, the user can disengage the adjustable stop button 110, to follow the operations as discussed in the fourth step in the above paragraphs. The strap 132 gets completely retracted, automatically using the energy stored in the spiral spring or the clock spring 126. During next use the use can simply pull the strap 132 to a length just beyond the present length of the strap 132, and can release the strap 132 to get automatically locked at the present length position using the automatic engagement or locking of the memory indicator 116 and the memory nut 118, as discussed in more detail in the fifth step of the above paragraphs. Further users are allowed to change the memory position of the strap 132 by simply disengaging the adjustable memory button 112 and thereafter adjusting the desired length of the strap 132 followed by engaging the adjustable memory button 112. The present memory button assembly 100 allows the users to comfortably sit inside the vehicles or other seating positions employing the memory button assembly 100 as a restraining system, without having to worry about and wasting the time required for setting the desired length of the strap during each time of usage.

Figure 7:
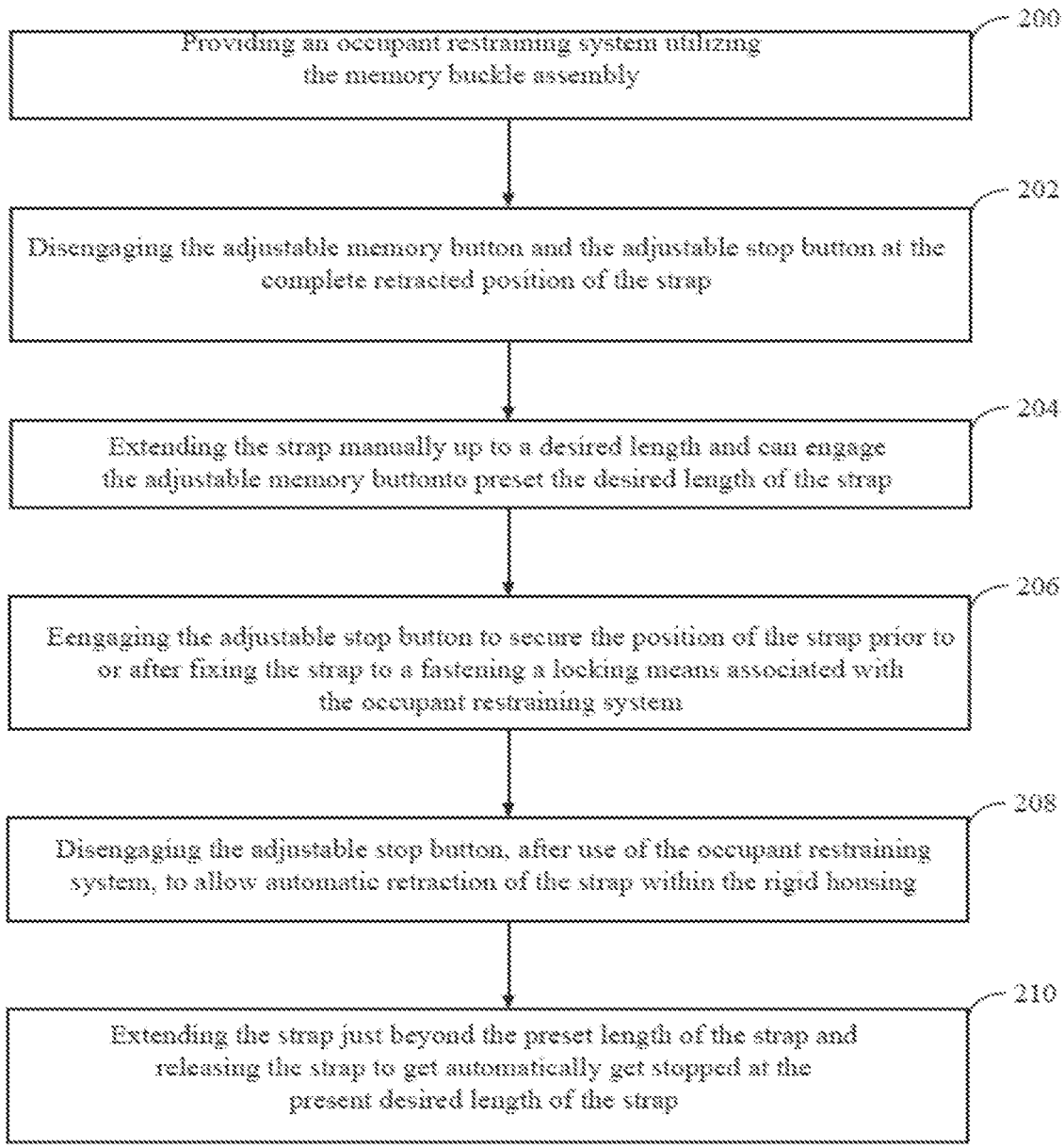
FIG. 7 is a method of operating the present memory buckle assembly, according to one of the present disclosure.

Finally, turning to FIG. 7, there is one exemplary method using the vehicle restraining example, there is an illustration of operating the present memory buckle assembly 100, according to an embodiment of the present disclosure. The method includes the steps of providing an occupant restraining system utilizing the present memory buckle assembly 100, as in block 200. Then as in block 202, the user can disengage the adjustable memory button 112 and the adjustable stop button 110 at the complete retracted position of the strap 132. Now the user can extend the strap 132 manually up to a desired length and can engage the adjustable memory button 110 to preset the desired length of the strap 132 for next use, as in block 204. Then as in block 206, the user can engage the adjustable stop button 110 to secure the position of the strap 132 prior to or after fixing the strap to a fastening a locking device associated with the occupant restraining system. Now as in block 208, the user can release or disengage the adjustable stop button 110, after use of the occupant restraining system to allow automatic retraction of the strap 132 within the rigid housing 102 of the memory buckle assembly 100. During next use of the memory buckle assembly 100, as in block 210, the users can extend the strap 132 just beyond the preset length of the strap 132 and can release the strap 132 to get automatically get stopped at the present desired length of the strap 132. Once the strap 132 gets automatically stopped at the preset length, the user can engage the adjustable stop button 110 and secure the position of the strap 132.

The present memory buckle assembly 100 saves the precious time and avoids the hassle of the users while adjusting the strap 132 to the desired length during each time of use of the same object, whatever the object is. It is noted, that the present memory buckle assembly 100 can be employed in many objects such as, but not limited to, vehicles, airplanes, suit cases, bags, package holding devices, restraining devices, purses, brief cases, and any other yet to be discovered object best employing a secure set strap length for the users. The users can simply adjust the adjustable memory button 112 during first use and then can simply pull or extend and release the strap 132 to get automatically locked at the preset position of the strap 132.

Further, it should be noted that the steps described in the method of use could be carried out in many different orders according to user preference. The use of "step of" should not be interpreted as "step for", in the claims herein and is not intended to invoke the provisions of 35 U.S.C. § 112, (6). Upon reading this specification, it should be appreciated that, under appropriate circumstances, considering such issues as design preference, user preferences, marketing preferences, cost, technological advances, etc., other methods of use arrangements, elimination or addition of certain steps, including or excluding certain maintenance steps, etc., may be sufficient.

The foregoing description of the preferred embodiment of the present invention has been presented for the purpose of illustration and description. It is not intended to be exhaustive or to limit the invention to the precise form disclosed. Many modifications and variations are possible in light of the above teachings. It is intended that the scope of the present invention not be limited by this detailed description, but by the claims and the equivalents to the claims appended hereto.

What is claimed is:

1. A memory buckle assembly for use with an object holding system, comprising:
   a) a left outside casing and a right outside casing, each having a bottom covering portion, a side covering portion and a top covering portion configured to be removably coupled to define an interior space for operably housing a plurality of components including a strap;
   b) a left inside case plate configured to fit inside the left outside casing;
   c) a right inside case plate configured to fit inside the right outside casing;
   d) an adjustable stop button operably mounted on the left inside case plate and the right inside case plate;
   e) an adjustable memory button operably mounted on the left inside case plate and the right inside case plate;
   f) a stop button configurator assembly operably positioned between the left inside case plate and the right inside case plate and configurable using the adjustable stop button for adjusting a position of the strap during an expansion and a retraction of the strap;
   g) a memory button configurator assembly operably positioned between the left inside case plate and the right inside case plate and configurable using the adjustable memory button for enabling retention of a preset expanded position of the strap;
   h) a memory gear having a hollow elongated portion and a gear head rotatably fixed to the right inside case plate, wherein a hollow interior of the hollow elongated portion is provided with a locking to adjustably couple with the memory button configurator assembly;
   i) a spool gear rotatably attached to the right inside case plate to enable operation of the stop button configurator assembly to expand and retract the strap;
      wherein the stop button configurator assembly is operably coupled to the memory button configurator assembly utilizing the spool gear and the memory gear to enable the expansion and retraction of the strap assisted by manual adjustments of the adjustable stop button and manual presetting of an expanded position of the strap utilizing the adjustable memory button.

2. The memory buckle assembly of claim 1, wherein the stop button configurator assembly comprises:
   a) a spool having a first end, a second end and an elongated center portion operably positioned along a first axis inside a rigid housing, between the left inside case plate and the right inside case plate, for winding the strap around the elongated center portion;
   b) a clock spring operably attached to the first end of the spool device; and
   c) a spool gear operably attached to the second end of the spool device;
   wherein a rotation of the spool device enables expansion of the strap and a rotation of the clock spring enables automated retraction of the strap.

3. The memory buckle assembly of claim 1, wherein the memory button configurator assembly comprises:
   a) a memory screw having a first end, an threaded elongated portion and a second end placed along a second axis parallel to the first axis of the memory buckle assembly;
   b) a memory indicator movably coupled to the threaded elongated portion of the memory screw to move in a forward and a backward direction along the second axis of the memory screw;
   c) a memory nut operably coupled to the threaded elongated portion of the memory screw to rotatably move in the forward and the backward direction along the second axis of the memory screw; and
   d) a memory spring provided around the memory screw capable of pushing the memory indicator to the memory nut along the second axis during the expansion and retraction of the strap.

4. The memory buckle assembly of claim 3, wherein the memory indicator comprises:
   a top cylindrical surface having a plurality of engaging devices for removably engaging with the adjustable memory button;
   a circular inner surface configured to move in a forward and backward direction over the memory screw;
   at least one protruded portion provided on a side surface for removably engaging with the memory nut;
   at least one chamfered portion provided on the side surface for allowing an automated disengagement and rotation of the memory nut;
   wherein the protruded portion and the chamfered portion provided on the side surface of the memory indicator enables a locked movement and a separated movement of the memory indicator and the memory nut during the expansion and retraction of the strap.

5. The memory buckle assembly of claim 3, wherein the memory nut comprises:
   a top cylindrical smooth surface having a dimension configured to move inside and out of the hollow elongated portion of the memory gear;
   a circular inner surface configured to move in a forward and backward direction over the memory screw;
   a side surface having at least one projected portion for engaging with the protruded portion provided on the side surface of the memory indicator;
   wherein the projected portion on the side surface of the memory nut and the protruded portion and the chamfered portion provided on the side surface of the memory indicator enables the locked movement and the separated movement of the memory indicator and the memory nut during the expansion and retraction of the strap.

6. The memory buckle assembly of claim 1, wherein the left inside case plate and the right inside case plate, each includes a pair of grooves to operably mount a pair of ends of each of the adjustable stop button device and the adjustable memory button along the first axis and the second axis parallel to each other.

7. The memory buckle assembly of claim 1, wherein the adjustable memory button enables a user to manually preset the expanded position of the strap in a plurality of steps including:
   a. disengaging the adjustable memory button and the adjustable stop button to form a complete retracted position of the strap;
   b. expanding the strap manually up to a desired length and engaging the adjustable stop button and the adjustable memory button, wherein engaging the adjustable memory button at the desired length of the expanded strap presets the expanded position of the strap; and
   c. disengaging the adjustable stop button to release the strap to achieve the complete retracted position of the strap;
   d. expanding the strap manually until being stopped at the expanded position of the strap and engaging the adjustable stop button;
      wherein the adjustable memory button being kept in an engaged position to maintain a preset length of the expanded position of the strap.

8. The memory buckle assembly of claim 7, wherein the memory spring provided around the memory screw pushes the memory indicator and the memory nut towards the hollow elongated portion of the memory gear along the second axis during the complete retracted position of the strap.

9. The memory buckle assembly of claim 7, wherein expansion of the strap pushes and compresses the memory nut with the memory indicator and the memory nut towards the left inside case plate.

10. The memory buckle assembly of claim 7, wherein engaging the adjustable memory button fixes a position of the memory indicator to limit a movement of the memory nut up to the memory indicator, wherein limiting the movement of the memory nut up to the memory indicator limits a movement of the memory gear and the expansion of the strap.

11. The memory buckle assembly of claim 10, wherein the protruded portion provided on the side surface removably engages with the projected portion on the side surface of the memory nut to limit the movement of the memory nut up to the memory indicator.

12. A memory buckle assembly for use with an object holding system, comprising:
   a) a left outside casing and a right outside casing, each having a bottom covering portion, a side covering portion and a top covering portion configured to be removably coupled to define an interior space for operably housing a plurality of components including a strap;
   b) a left inside case plate configured to fit inside the left outside casing;
   c) a right inside case plate configured to fit inside the right outside casing;
   d) an adjustable stop button operably mounted on the left inside case plate and the right inside case plate;

e) an memory button operably mounted on the left inside case plate and the right inside case plate;
f) a stop button configurator assembly operably positioned between the left inside case plate and the right inside case plate and configurable using the adjustable stop button for adjusting a position of the strap during an expansion and a retraction of the strap; and
g) a spool gear rotatably attached to the right inside case plate to enable operation of the stop button configurator assembly to expand and retract the strap.

13. The memory buckle assembly of claim 12, further comprising:
a) the memory button configurable for enabling retention of a preset expanded position of the strap; and
b) a memory gear having a hollow elongated portion and a gear head rotatably fixed to the right inside case plate, wherein a hollow interior of the hollow elongated portion is provided with a locking device to adjustably couple with the memory button;
wherein the stop button configurator assembly is operably coupled to the memory button utilizing the spool gear and the memory gear to enable the expansion and retraction of the strap assisted by manual adjustments of the adjustable stop button and manual presetting of an expanded position of the strap utilizing the memory button.

14. The memory buckle assembly of claim 13, wherein the stop button configurator assembly comprises:
d) a spool having a first end, a second end and an elongated center portion operably positioned along a first axis inside a rigid housing, between the left inside case plate and the right inside case plate, for winding the strap around the elongated center portion;
e) a clock spring operably attached to the first end of the spool; and
f) a spool gear operably attached to the second end of the spool;
wherein a rotation of the spool device enables expansion of the strap and a rotation of the clock spring enables automated retraction of the strap.

15. The memory buckle assembly of claim 14, wherein the memory button further comprises:
a) a memory screw having a first end, an threaded elongated portion and a second end placed along a second axis parallel to the first axis of the buckle assembly;
b) a memory indicator movably coupled to the threaded elongated portion of the memory screw to move in a forward and a backward direction along the second axis of the memory screw;
c) a memory nut operably coupled to the threaded elongated portion of the memory screw to rotatably move in the forward and the backward direction along the second axis of the memory screw; and
d) a memory spring provided around the memory screw capable of pushing the memory indicator to the memory nut along the second axis during the expansion and retraction of the strap.

16. The memory buckle assembly of claim 15, wherein the memory nut comprises:
a) a top cylindrical smooth surface having a dimension configured to move inside and out of the hollow elongated portion of the memory gear;
b) a circular inner surface configured to move in a forward and backward direction over the memory screw;
c) a side surface having at least one projected portion for engaging with the protruded portion provided on the side surface of the memory indicator;
wherein the projected portion on the side surface of the memory nut and the protruded portion and the chamfered portion provided on the side surface of the memory indicator enables the locked movement and the separated movement of the memory indicator and the memory nut during the expansion and retraction of the strap.

17. The memory buckle assembly of claim 16, wherein the left inside case plate and the right inside case plate, each includes a pair of grooves to operably mount a pair of ends of each of the adjustable stop button and the memory button along the first axis and the second axis parallel to each other.

* * * * *